Oct. 24, 1933.   D. ROBERTSON   1,931,623.
APPARATUS FOR TREATING FOODSTUFFS
Filed Feb. 12, 1931   3 Sheets-Sheet 1

INVENTOR
D. ROBERTSON
BY
ATTORNEY

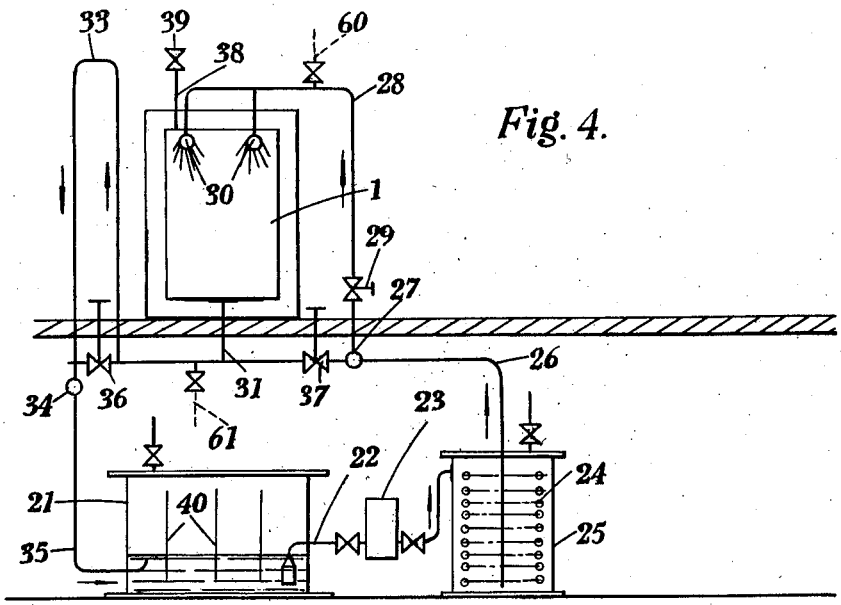
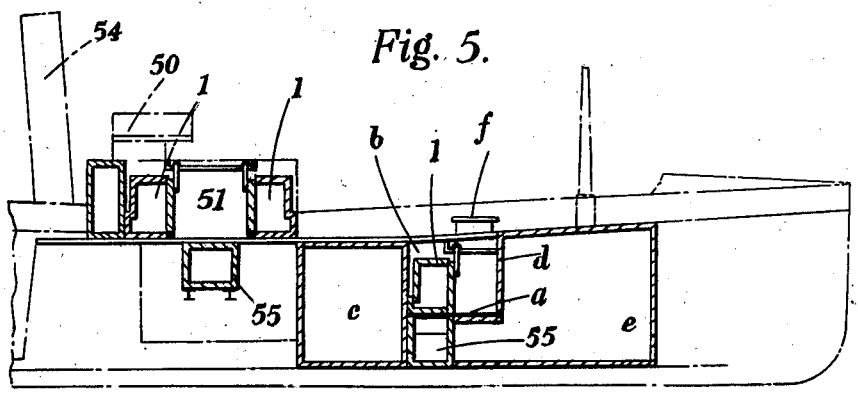
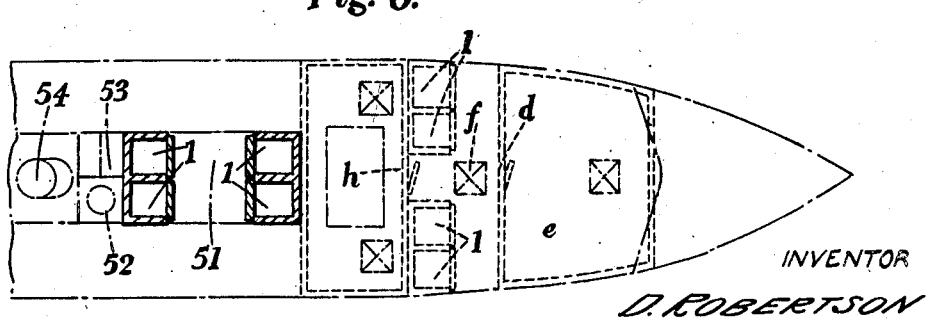

Patented Oct. 24, 1933

1,931,623

UNITED STATES PATENT OFFICE

1,931,623

APPARATUS FOR TREATING FOODSTUFFS

David Robertson, Dulwich, London, England

Application February 12, 1931, Serial No. 515,363, and in Great Britain February 14, 1930

5 Claims. (Cl. 62—104)

In connection with the preservation of foodstuffs, and more particularly in connection with the preservation of catches on board fishing ships, it has already been proposed to chill or freeze the catch by flooding in a closed chamber through which a stream of cooled or chilled liquid is circulated.

The present invention has for its primary object to provide an improved arrangement affording substantial economy of space, which is a very important consideration on fishing craft. The invention is, however, not limited in its application to fishing craft as its advantages may be convenient in shore installations.

According to the invention, I provide in apparatus for subjecting foodstuffs to a circulating cooling fluid, a cooling chamber having a substantially complete vertical side movable on supports in a direction at right angles to its surface and preferably having a holder or carrier supporting a load of foodstuffs to be cooled attached to its inner surface, said vertical side closing against the adjoining walls of the chamber in a liquid tight manner.

The invention further comprises improvements in ships according to which one or more chambers of the type set forth are conveniently set up adjacent a suitable working space for cooling or chilling of the catch prior to its storage in the insulated holds. It is normally intended to provide sufficient chilling or freezing chambers to deal with a normal one day's catch, after which the chambers are cleared for dealing with the next catch and so on throughout the cruise.

In connection with the use of brine, it is important to avoid the production of foam in the chamber or any part of the supply line, and the invention includes the provision of a cooling chamber having liquid inlet and outlet pipes at the top and bottom thereof, the outlet pipe being connected to a supply main by a valved conduit so that it may be utilized for initially flooding the chamber from below.

The invention will now be described by way of example in the following particular description aided by the accompanying drawings in which Figure 1 is a sectional view taken on the line 1—1 of Fig. 1.

Figure 2 a transverse cross section of a chilling or freezing chamber in accordance with the invention.

Figure 4 illustrates diagrammatically a form of cooling plant for the circulating medium, and Figures 5 and 6 illustrate in sectional elevation and plan an ordinary construction of steam trawler provided with two alternative arrangements of cooling chambers.

Figure 1:
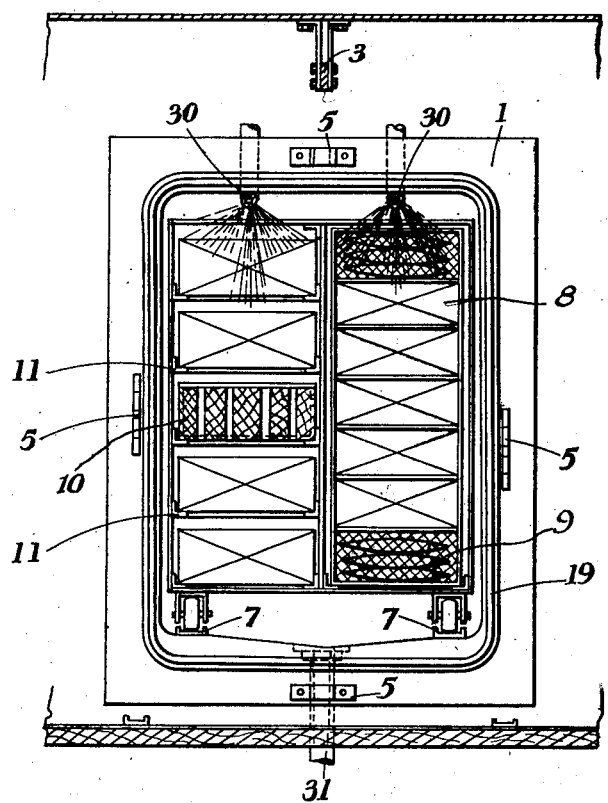
Figure 2:
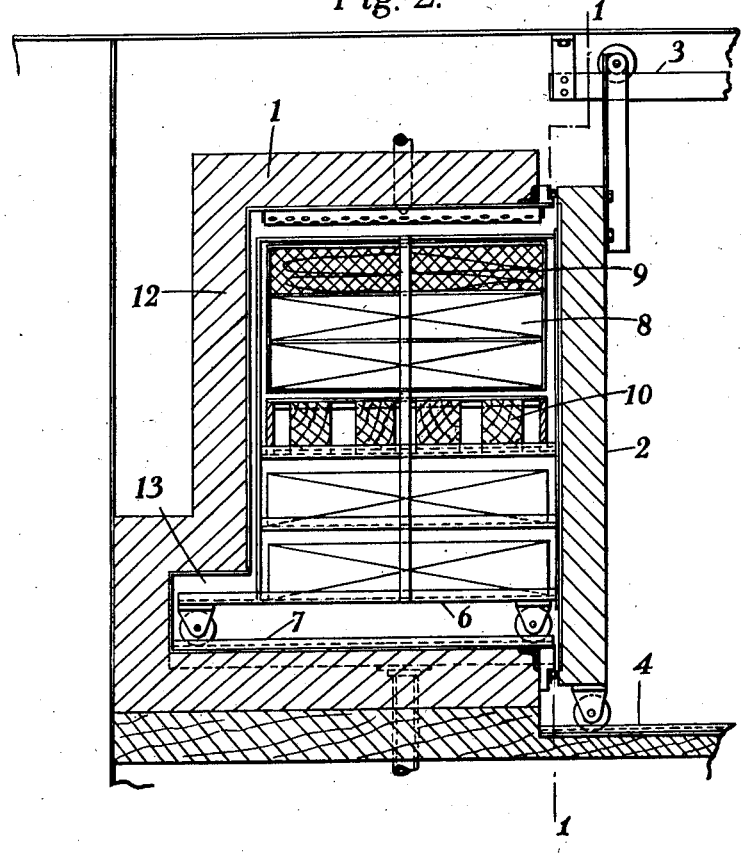

Turning now to the forms illustrated, Figs. 1 and 2 show a cooling chamber 1, having a vertical door 2, movable in a direction at right angles to its face to close the entrance to the chamber 1. The door is supported by means of wheels from an upper rail 3 and on a lower rail or rails 4, and is adapted to be firmly secured when in the closed position by any suitable or usual form of locking bolts adapted to engage in catches 5 fixed in the front face.

In the form shown in Figs. 1 and 2, the door is provided with a holder or carrier 6 for the charge requiring to be treated, the carrier being solidly fixed to the door 2 and provided with wheels running on rails 7 on the floor of the chamber. The carrier 6 may be provided with shelf-like fittings adapted to hold metal boxes 8 having perforated bottoms, wire cages 9 or wooden slatted boxes 10 filled with fish angle pieces 11 or any other suitable means being provided to prevent movement of the boxes under the pitch or roll of the ship.

The longitudinal supporting girders of the carrier 6 are extended to the left in Fig. 2 beyond the remote wall of the shelf framework in order that when the door 2 is moved its extreme distance to the right in Fig. 2, the charge will be clear of the face of the cooling chamber 1, but the innermost supporting wheels of the carrier will still rest on the rails 7. For this reason the rearmost wall 12 of the cooling chamber is made L-shaped to form a recess 13 to receive the rearmost ends of the frame girders of the carrier. It will be understood that any suitable form of blocks or catches is provided to limit the opening movement of the door and hold it firmly in its opened position during loading and unloading of the carrier.

Figure 3:
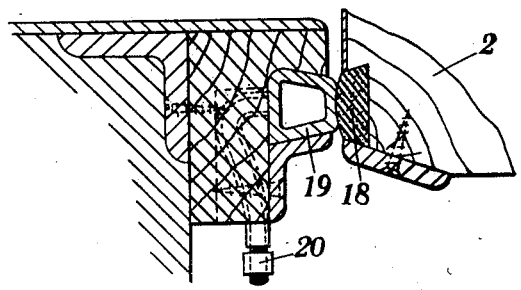
Figure 3 is a detail drawn to a much enlarged scale showing the construction of a form of liquid-tight joint for the door of the chamber.

In order that the door may close against the face of the chamber with a liquid tight joint of considerable strength to correspond with the height of the chamber and the pressure of the circulating pump, the door 2 is provided with a resilient beading 18, Fig. 3, of rubber or the like, and the open face of the chamber is provided with an inflatable beading 19 preferably of rubber and adapted to be expanded by compressed air against the beading 18 with the requisite amount of pressure. For this purpose one or more pipes 20 are provided giving access to the interior of the inflatable beading or gasket 19.

In Fig. 4 is illustrated diagrammatically a suitable form of plant for circulating a liquid medium through the chamber 1. According to this construction, I provide a storage tank 21 which will usually receive a considerable quantity of brine. The suction pipe 22 is coupled to a pump 23 and thereafter to a cooler 25 fitted with cooling coils 24 connected to a refrigerating plant. From the chamber 25 the delivery pipe 26 is connected to a main 27 adapted to supply any required number of cooling chambers. From the main 27 a supply pipe 28 provided with a valve 29 leads to a plurality of delivery pipes 30 mounted within the top of the chamber 1.

The outflow pipe 31 from the chamber 1 extends through a U-shaped pipe 33 rising above the height of the chamber to a second main 34 discharging into the storage tank through the pipe 35. The ends of the U-shape section 33 are connected by a pipe provided with a valve 36 adapted to short circuit the U-shaped section when required, and the main 27 is also connected to the outflow pipe 31 through a section of piping provided with a valve 37 so that the outflow pipe 31 may be utilized additionally to the delivery pipes 30 for initially filling the chamber 1. An air release and overflow pipe 38 provided with a valve 39 is fitted above the top of the chamber 1.

The apparatus as described will usually be operated as follows:—

On starting up, valve 36 is closed, valves 29, 37 and 39 being open. Brine is pumped out of the chamber 21 over the coils 24 and into the chamber 1 through pipe 31, the brine at the same time rising in pipe 28 to the same level as in the chamber. Air is discharged from the chamber 1 through pipe 38 and valve 39, and when brine is discharged through this pipe, it is an indication that the chamber 1 has been filled. Valve 37 is now closed and also valve 39 and brine continues to be circulated through the chamber 1 as indicated by the arrows, entering the chamber 1 through pipe 28 and evacuating through section 33.

It will be realized that during the filling operation, the brine rises in the chamber 1 from below so that the production of foam, which would be liable to occur through splashing if the chamber 1 were initially filled through pipes 30, is avoided.

On the completion of the cooling or chilling process, valve 39 and 36 are opened and valve 29 is shut, and the chamber 1 will then evacuate into the storage tank 21. It will be realized that brine may be supplied simultaneously to a plurality of storage chambers 1 arranged one behind the other from the storage tank 21 by means of the mains 27, 34.

Preferably, I provide in the storage chamber 21 a plurality of baffles 40 having orifices for intercommunication, the orifices being preferably covered with wire gauze, felt or the like to form filters. Alternatively, suitable filters may be provided in any other suitable part of the path of circulation.

When the fish in the chamber 1 has been sufficiently frozen or chilled, it is removed from the chamber and subjected to a stream of fresh water, or sea water as the case may be, to wash off the brine and thoroughly glaze the catch; after which the boxes are removed from the carrier and stored in the holds of the ship. It should be noted, however, that the method and apparatus as hitherto described are applicable to the treatment of large fish or other foodstuffs which may be suspended from the upper cross bars of the carrier 6.

In connection with the carrying out the invention on board ship, I will first describe the provision of an installation which can be added to a trawler of ordinary construction. According to this form of execution, the cooling chambers 1 are mounted on a floor a, which is set up in the fish storage room e joining up with the aft bulkhead d or the forward bulkhead forming one of the ends of the fish room.

In the form illustrated, four chambers 1 are provided contiguous the forward wall of the extra coal bunker c, sufficient working space equal at least to the width of the chambers being left between the doors of the chambers and the partition d. The fish will be dumped through the hatch f on to the working space and loaded into the chambers, and after treatment will be stored in the forward hold e which will be provided with suitable cooling coils operated from the refrigerator.

Normally, it should be sufficient to deal with an ordinary day's catch if four chambers 1 are provided. Alternatively, these may be arranged centrally of the width of the ship in a single block with passage-ways on both sides of the block. It is thought that the present invention may enable cruises of longer duration to be undertaken in which case the extra coal bunker c will be insulated and filled with cooling pipes and will be the first to be emptied of coal and thereafter cleaned and utilized for the storage of the chilled or frozen fish, for which purpose direct access is provided with the working space of floor a, e. g. through a door in partition h.

Alternatively, where the cooling plant is built in a new construction of ship, I preferably arrange the cooling chambers 1 on deck below the wheel house 50, Fig. 5, with a working space 51 between two blocks of cooling chambers. The brine cooler 52 and pump 53 can be conveniently housed forward of the funnel 54 and adjacent the cooling chambers. In both constructions a brine storage tank 55 or 21 is provided below the cooling chambers, and this is preferably lagged.

It is to be understood that the invention is not limited to the precise forms shown and described above. For example, the evaporator coils 24 need not necessarily be fitted in a separate cooler 25, but might be mounted in the storage tank 21. In certain cases the evaporator coils might be dispensed with and the plant utilized merely for the circulation of cold water or brine, the temperature of which is kept down by supplies of ice and salt in the tank 21.

On large ships, and also in land installations, it will be obvious that many variations and alterations may be made in the design and arrangement of the cooling chambers to facilitate manual handling and transportation.

Further, for washing and glazing the fish after freezing has been completed, I preferably provide a branch pipe as shown in dotted lines at 60, Fig. 4, provided with a stop cock and leading to the branch supply section 28 for the purpose of supplying sea water or fresh water, a corresponding branch pipe shown in dotted lines at 61 also provided with a cock being connected to the outflow pipe 31.

In the form shown, the floor and roof of the chamber define the upper and lower limits of the door opening; but the invention includes such slight modifications as the provision of a small flange extending slightly below the roof or slightly above the floor such as might be structurally desirable in a steel plate construction provided that the door comprises substantially a complete vertical side of the chamber and is thus differentiated from known constructions which included one or more doors provided in a vertical wall, the area of the door or doors being much smaller than the area of said wall.

I claim:—

1. In apparatus for subjecting foodstuffs to a circulating fluid, a chamber having a substantially complete vertical side movable on supports in a direction at right angles to its surface and having a holder or carrier for supporting a load of foodstuffs to be treated attached to its inner surface, said vertical side closing the chamber in a liquid-tight manner, and means to circulate a fluid through said chamber.

2. A chamber as claimed in claim 1, in which the joint of the movable side is made by an inflatable pressure element.

3. In apparatus for subjecting foodstuffs to a circulating fluid, a chamber having liquid inlet and outlet pipes at the top and bottom thereof respectively, a supply main for circulating fluid adapted to be connected to said inlet pipe, said outlet pipe being also connected to said supply main by a conduit, and a valve controlling said conduit whereby said outlet pipe may be utilized for initially flooding the chamber from below and be thereafter shut off, the upper pipe being thereafter utilized as the sole inlet for circulating fluid.

4. A chamber as claimed in claim 3, having a door and in which the joint therefor is made by an inflatable pressure element.

5. Foodstuff preserving apparatus comprising a cooling chamber, a liquid storage chamber located below said cooling chamber, an outlet pipe located in the bottom of said cooling chamber, an inlet pipe located in the top of said chamber, said outlet pipe being connected by a conduit to said storage chamber, a valve to said conduit, a by-pass pipe to said valve including an element located above the top of said chamber, a valve-controlled conduit between said inlet pipe and said storage chamber, a valve-controlled connecting pipe between said conduit and said outlet pipe, a valve-controlled air-release and re-entry port to said cooling chamber, and means to circulate fluid cyclically through said chambers.

DAVID ROBERTSON.